(12) United States Patent
Le Polles

(10) Patent No.: US 10,844,785 B2
(45) Date of Patent: Nov. 24, 2020

(54) SYSTEM FOR DESCALING AN INTERNAL COMBUSTION ENGINE

(71) Applicant: FLEX FUEL-ENERGY DEVELOPMENT, Valbonne (FR)

(72) Inventor: Sébastien Alain Le Polles, Montigny-sur-Loing (FR)

(73) Assignee: FLEX FUEL—ENERGY DEVELOPMENT, Valbonne (FR)

( * ) Notice: Subject to any disclaimer, the term of this patent is extended or adjusted under 35 U.S.C. 154(b) by 354 days.

(21) Appl. No.: 15/763,518

(22) PCT Filed: Sep. 30, 2016

(86) PCT No.: PCT/FR2016/052503
§ 371 (c)(1),
(2) Date: Mar. 27, 2018

(87) PCT Pub. No.: WO2017/055768
PCT Pub. Date: Apr. 6, 2017

(65) Prior Publication Data
US 2018/0313264 A1 Nov. 1, 2018

(30) Foreign Application Priority Data
Oct. 2, 2015 (FR) ..................................... 15 02059

(51) Int. Cl.
*B08B 7/00* (2006.01)
*F02B 77/04* (2006.01)
*F02M 26/50* (2016.01)
*B08B 3/08* (2006.01)
*C25B 1/04* (2006.01)
*F02M 26/00* (2016.01)

(52) U.S. Cl.
CPC ................ *F02B 77/04* (2013.01); *B08B 3/08* (2013.01); *B08B 7/0021* (2013.01); *C25B 1/04* (2013.01); *F02M 26/50* (2016.02); *F02M 2026/001* (2016.02); *Y02E 60/366* (2013.01)

(58) Field of Classification Search
CPC .. F02B 77/04; F02M 26/50; F02M 2026/001; B08B 3/08; B08B 7/0021; C25B 1/04; Y02E 60/366
See application file for complete search history.

(56) References Cited

U.S. PATENT DOCUMENTS

2006/0248875 A1* 11/2006 Maganas ................... F01N 3/10
60/274
2008/0011327 A1 1/2008 Shriner et al.

FOREIGN PATENT DOCUMENTS

| CN | 104863731 A | * | 8/2015 |
| CN | 103206306 B | * | 10/2015 |
| WO | WO 00/47344 | | 8/2000 |
| WO | WO 00/51751 | | 9/2000 |
| WO | WO 2009/156670 | | 12/2009 |

OTHER PUBLICATIONS

CN104863731A—Machine translation (Year: 2015).*
CN103206306B—Machine translation (Year: 2015).*

* cited by examiner

*Primary Examiner* — Tinsae B Ayalew
(74) *Attorney, Agent, or Firm* — Occhiuti & Rohlicek LLP

(57) ABSTRACT

A descaling system includes injector arranged to inject cleaning fluid over an inlet for inflow of a fuel-air mixture of an internal-combustion engine and a controller that opens or closes the engine's EGR valve according to parameters of the injected cleaning fluid.

12 Claims, 1 Drawing Sheet

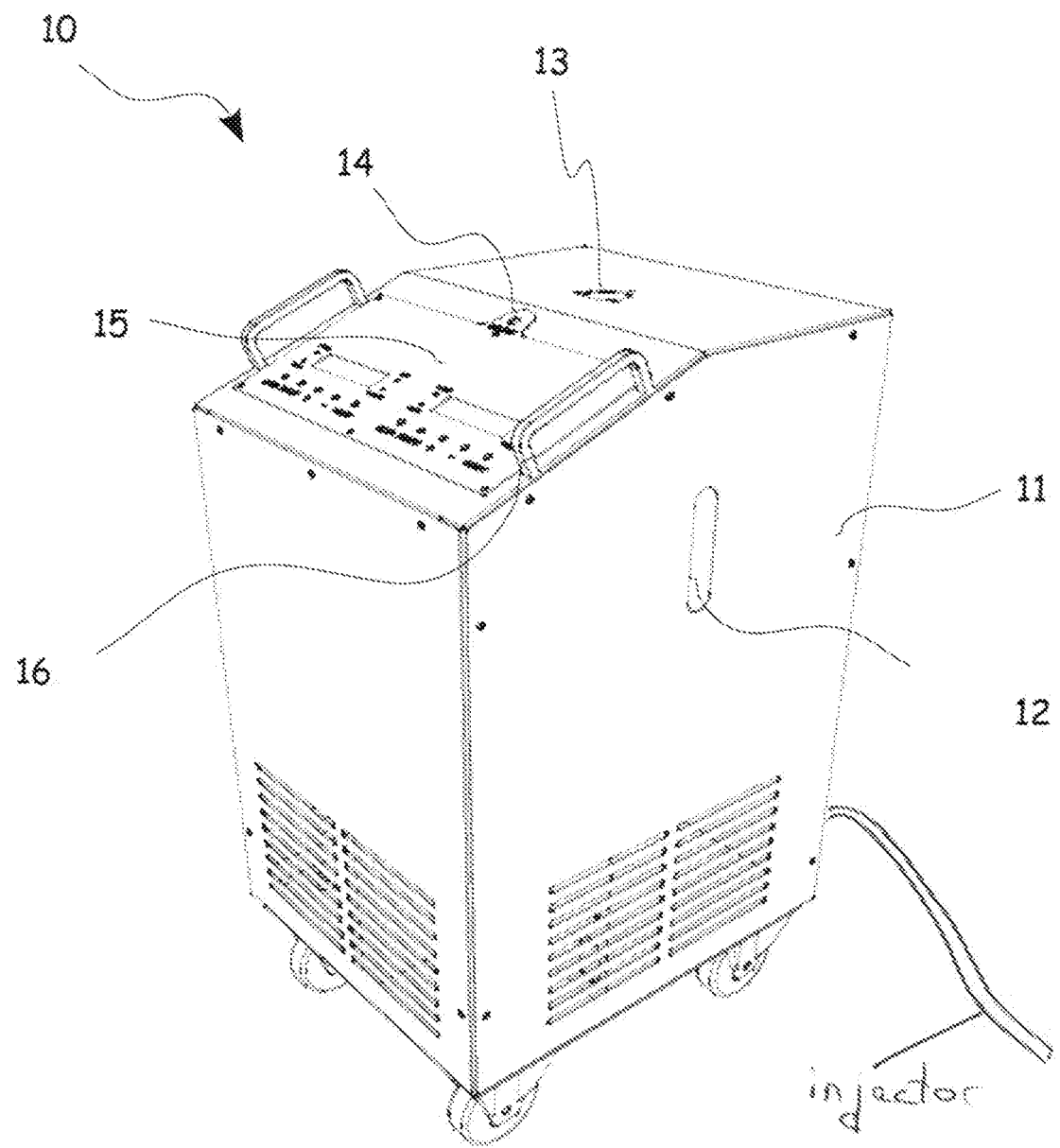

SYSTEM FOR DESCALING AN INTERNAL COMBUSTION ENGINE

CROSS REFERENCE TO RELATED APPLICATION

This application is the national phase under 35 USC 371 of international application no. PCT/FR2016/052503, filed Sep. 30, 2016, which claims the benefit of the Oct. 2, 2015 priority date of French application no. 1502509.

TECHNICAL FIELD AND PRIOR ART

The invention relates to a system for descaling an internal combustion engine, system comprising an injection means arranged so as to inject a cleaning fluid over an inlet for the inflow of a fuel-air mixture of the running engine. The invention is advantageous in particular for the maintenance of motor vehicles, such as light vehicles, light and heavy commercial vehicles, heavy trucks, and more generally for the maintenance of any system equipped with an internal combustion heat engine.

In a known manner, in internal combustion engines, in particular of the Diesel type, so as to reduce the production of NOx, consisting of particularly polluting nitrogen oxide compounds, it is necessary to reduce the combustion temperature and to reduce the quantity of oxygen available inside the running engine. To do this, a technique developed in the seventies consists in redirecting a portion of the inert exhaust gases towards the inlet for the inflow of the fuel-air mixture of the engine. A variable flow rate EGR (exhaust gas recirculation) valve is positioned on the recirculation circuit between the exhaust and the inflow inlet; the valve opening rate is controlled by the computer of the system (vehicle or other) whose engine is equipped with an EGR valve, according to engine parameters such as a measured temperature of the exhaust gas, a power demanded to the engine, etc. The production of nitrogen oxides depends in particular on the temperature and on the presence of oxygen during combustion, the introduction of exhaust gas acts on the two parameters (temperature and proportion of oxygen).

Although the use of an EGR valve makes it possible at minimal cost to reduce the production of NOx, it has other disadvantages. In particular, the reduction of the combustion temperature, sought so as to limit the production of NOx, also causes the production of soot to increase during combustion, which has the particular consequence of clogging the inflow circuit, the exhaust gas evacuation circuit and the exhaust gas recirculation circuit; this reduces engine performance and increases the pollution generated by the engine.

A known technique for cleaning the engine and its circuits consists in injecting a fluid comprising hydrogen and oxygen into the inflow circuit while the engine is running. The highly inflammable quality of the hydrogen makes it possible to improve combustion in the cylinders of the engine. Recombining the hydrogen and the oxygen into water in the supercritical state, acting as a solvent, makes it possible to dilute and evacuate the scale situated on the sensitive parts of the engine, in particular the heads and check valves of injectors, the turbo or turbos, the EGR valve, the inflow and exhaust valves, the pistons, the piston rings, the cylinders, the inflow circuit and manifold, and in certain conditions, the particulate filter and the catalytic converter.

However, it is found in practice that the known techniques of injecting cleaning fluid have a limited efficiency, in particular for cleaning the inflow circuit and manifold, the inflow valves and the EGR valve of the running engine.

DESCRIPTION OF THE INVENTION

The invention aims to improve the known systems for descaling an internal combustion engine, system of the type comprising an injection means arranged so as to inject a cleaning fluid over an inlet for the inflow of a fuel-air mixture of the running engine.

To this effect, the descaling system according to the invention is characterized in that it also comprises a control means arranged so as to control an opening or closing of an EGR valve of the engine according to parameters of the injected cleaning fluid.

Controlling the opening and closing of the EGR valve through the actual descaling system enables the cleaning fluid to be made to circulate better in the top-engine part, in the inflow circuit and in the gas recirculation circuit, by gaining freedom from the opening/closing duty cycle of the EGR valve as imposed by the designer. It therefore becomes possible to clean the actual EGR valve, the air inflow circuit, the inflow valves and the turbo in a reliable, simpler and more thorough manner.

In a descaling system according to the invention, the cleaning fluid can be a hydrogen/oxygen mixture in predefined proportions, and for example water in the supercritical state.

According to an embodiment, the descaling system according to the invention can also comprise, upstream of the injection means, a device for producing gaseous oxygen and hydrogen by electrolysis of water. The descaling system therefore becomes fully autonomous and can therefore be moved as close as possible to an engine to be cleaned.

The control means is preferably arranged so as to control an opening or closing of the EGR valve for a predefined duration dependent on a duration or rate of injection of cleaning fluid. Adjusting the opening/closing of the EGR valve according to the duration and/or rate of injection allows the quality and speed of the cleaning process performed to be optimized.

According to an embodiment, the control means can be arranged so as to control the EGR valve according to a cycle comprising a first phase of opening the EGR valve for a first predefined period followed by a second phase of closing the EGR valve for a second predefined period, cycle repeated according to the duration of injection of the cleaning fluid. When the EGR valve is closed, cleaning takes place mainly at the downstream circuit of the engine, particularly at the exhaust circuit. Opening the EGR valve allows the upstream circuit of the engine to be thoroughly cleaned, that is to say the inflow circuit and the exhaust gas recirculation circuit, in particular the portion of the recirculation circuit situated between the EGR valve and the inlet for the inflow of the engine gas.

According to another embodiment, the control means can be arranged so as to control the EGR valve according to a cycle repeated at a cycle frequency dependent on the duration of injection of the cleaning fluid, cycle comprising a first phase of opening the EGR valve for a first predefined period, a second phase of closing the EGR valve for a second predefined period and a third phase during which the EGR valve is alternately opened and closed at a frequency at least ten times higher than the repetition frequency of the cycle, for a predefined third period. The third phase, with an alternating opening/closing control of the EGR valve makes it possible to "tap" the valve of the EGR valve, thereby generating micro-shocks and vibration which facilitate the dilution of the layers of carbon deposit present on the valve of the actual EGR valve.

Tests have made it possible to obtain good engine cleaning with the first, second and third predefined periods of the order of 1 to 10 minutes, and preferably of the order of 5 minutes, with, during the third period of the cycle, a change of state of the EGR valve every 0.5 seconds; namely a cleaning cycle of 3 to 30 minutes, preferably of the order of 15 minutes, cycle repeated for 1 to 2 hours for complete cleaning.

BRIEF DESCRIPTION OF THE FIGURES

The invention will be better understood, and other characteristics and advantages of the invention will emerge in the light of the description that follows of embodiment examples of an engine descaling system according to the invention. These examples are given as non-limitative. The description should be read with reference to the attached drawing in which the single FIGURE is an overview of a descaling system according to the invention.

DESCRIPTION OF AN EMBODIMENT OF THE INVENTION

As stated previously, the descaling system according to the invention is a system for descaling an internal combustion engine, descaling system of the type comprising an injection means arranged so as to inject a cleaning fluid over an inlet for the inflow of a fuel-air mixture of the running engine. The descaling system according to the invention is characterized in that it also comprises a control means arranged so as to control an opening or closing of an EGR valve of the engine according to parameters of the injected cleaning fluid.

According to an embodiment, not illustrated, the descaling system can be connected to an external cleaning fluid reservoir.

According to the embodiment illustrated on the drawing, the descaling system 10 according to the invention is fully autonomous and arranged so as to inject into the running engine a cleaning fluid which is a mixture of hydrogen and oxygen produced by the actual system.

To this effect, the descaling system 10 comprises, in a structure 11, a water reservoir and means known otherwise for producing hydrogen and oxygen by electrolysis of water. On the side of the structure, a window 12 is provided which allows the level of water in the reservoir to be seen. On the top of the structure, an opening 13 is provided with a plug for filling the water reservoir. On the top of the structure, a control panel 15 is also provided which allows the user to adjust the different parameters of the descaling system described below. On the control panel, a connector 14 is integrated so as to connect a cable connecting the installation directly to the vehicle, more precisely to the EGR valve of the engine so as to control the opening and/or closing thereof.

The descaling system illustrated is arranged so as to perform cleaning by controlling the EGR valve according to a cycle repeated at a cycle frequency dependent on the duration of injection of the cleaning fluid, cycle comprising a first phase of opening the EGR valve for a first predefined period, a second phase of closing the EGR valve for a second predefined period and a third phase during which the EGR valve is alternately opened and closed at a frequency at least ten times higher than the repetition frequency of the cycle, this taking place for a predefined third period.

In an automatic functioning mode, the descaling system is programmed to control the EGR valve of the vehicle being cleaned according to a cycle repeated for 30 minutes to 4 hours, cycle comprising:

- a first phase of opening the EGR valve for a first predefined period of approximately 5 minutes,
- a second phase of closing the EGR valve for a second predefined period of approximately 5 minutes, and
- a third phase during which the EGR valve is alternately opened and closed for periods of the order of 0.5 second, this alternating functioning lasting a third predefined period also of the order of 5 minutes.

According to an embodiment, the first period, the second period and the third period are substantially of the same duration.

Alternatively, the user can, from the control panel, choose the duration of each phase, for example between 0 and 120 minutes. According to the cylinder capacity of the engine, (engine, automobile, truck, etc.) and its degree of clogging, the user can also, still from the control panel, choose the total duration of the cleaning program and/or increase or reduce the flow rate of the cleaning fluid and/or change the proportions of the gaseous hydrogen/oxygen mixture of the cleaning fluid.

Many additional elements are envisaged for the safety and ergonomics of the descaling system, in particular the elements below.

The safety of the means of producing hydrogen is ensured by the presence of a water level sensor in the reservoir, a means of shutting down the production of hydrogen in the event of overpressure and a warning means (audio alarm). Also, when the fluid outlet is disconnected from the engine, the descaling system is sealed.

So as to facilitate moving the installation as close as possible to the engine to be cleaned, the installation is mounted on wheels and handle grips 16 are provided at human height.

An audio alarm is programmed 5 minutes before the end of the cleaning program, followed by a second alarm at the end of the program.

According to the embodiment illustrated on the drawing, all the elements of the descaling system according to the invention are integrated in a structure 10 having dimensions and a weight compatible with manual handling. Such a descaling system is well suited for cleaning engines of small or medium cylinder capacity, for example an engine of a private light vehicle, of a light commercial vehicle, of a motorbike, etc.

According to a variant, not illustrated but implemented, all the elements of a descaling system according to the invention are integrated in the useful volume of a light commercial vehicle, or on a trailer of a truck. The descaling system can therefore be moved without human effort. Furthermore, the device for producing hydrogen can be dimensioned to produce a greater flow rate of cleaning fluid and the injection means can be dimensioned so as to inject the cleaning fluid at a higher temperature and/or pressure. The descaling system is therefore better suited for dealing with engines of larger cylinder capacity.

The descaling system according to the invention can also be used for many applications other than the field of motor vehicles; it can thus be used to clean any type of engine: engines of boats, of military vehicles, engines in industrial installations, heating installation engines, etc.

The invention claimed is:

1. An apparatus comprising a descaling system for descaling an engine, wherein said descaling system comprises an injector and a controller, wherein said injector is arranged so as to inject cleaning fluid over an inlet for inflow of a fuel-air mixture of said engine, wherein said controller is arranged so as to open or close an exhaust-gas recirculation valve of said engine according to parameters of said injected cleaning fluid, and wherein said engine is an internal combustion engine that is running.

2. The apparatus of claim 1, wherein said cleaning fluid is a mixture that comprises hydrogen and oxygen and wherein said injector is arranged so as to produce said mixture according to predefined proportions of hydrogen and oxygen.

3. The apparatus of claim 2, further comprising an electrolysis unit that produces hydrogen and oxygen by electrolysis of water, wherein said electrolysis unit is disposed upstream of said injector so as to produce said cleaning fluid by creating a mixture of said hydrogen and oxygen provided by said electrolysis unit according to predefined proportions of hydrogen and oxygen.

4. The apparatus of claim 1, wherein said cleaning fluid is water in a supercritical state.

5. The apparatus of claim 1, wherein said controller is configured to open said exhaust-gas recirculation valve for a predefined duration that depends on a duration during which said cleaning fluid is being injected.

6. The apparatus of claim 5, wherein said controller is configured to control said exhaust-gas recirculation valve according to a cycle comprising a first phase followed by a second phase, wherein, in said first phase, said controller causes said exhaust-gas recirculation valve to be open for a first predefined-period, wherein in said second phase, said controller causes said exhaust-gas recirculation valve to be closed for a second predefined-period, and wherein said controller is configured to repeat said cycle during injection of said cleaning fluid.

7. The apparatus of claim 5, wherein said controller is configured to control said exhaust-gas recirculation valve according to a cycle that is repeated at a first frequency, wherein said first frequency depends on a duration of injection of said cleaning fluid, wherein each cycle comprises a first phase that lasts for a first predefined period, a second phase that lasts for a second predefined period, and a third phase that lasts for a third predefined period, wherein, in said first phase, said exhaust-gas recirculation valve is open, wherein, in said second phase, said exhaust-gas recirculation valve is closed, and wherein, in said third phase, said exhaust-gas recirculation valve alternately opens and closes at a second frequency, wherein said second frequency is at least ten times higher than said first frequency.

8. The apparatus of claim 7, wherein said first predefined period and said second predefined period have equal durations and wherein said second predefined period and said third predefined period have equal durations.

9. The apparatus of claim 8, wherein said first predefined period is between one and ten minutes.

10. The apparatus of claim 8, wherein said second predefined period is five minutes.

11. The apparatus of claim 8, wherein said first predefined period, said second predefined period, and said third predefined period are adjustable by a user of said descaling system to be no greater than 120 minutes.

12. The apparatus of claim 1, wherein said controller is configured to open said exhaust-gas recirculation valve for a predefined duration that depends on a rate of injection of said cleaning fluid.

* * * * *